United States Patent [19]

Breen et al.

[11] Patent Number: 4,614,362
[45] Date of Patent: Sep. 30, 1986

[54] TAMPER RESISTING MACHINE READABLE NEGOTIABLE INSTRUMENTS AND METHOD OF MAKING AND USING SAME

[75] Inventors: Thomas J. Breen, Arlington Heights; Sylvester H. Slowik, Naperville, both of Ill.

[73] Assignee: Rand McNally & Co., Skokie, Ill.

[21] Appl. No.: 670,572

[22] Filed: Nov. 13, 1984

Related U.S. Application Data

[63] Continuation-in-part of Ser. No. 612,854, May 22, 1984, abandoned.

[51] Int. Cl.$^4$ .............................................. B41L 1/20
[52] U.S. Cl. ..................................... 282/9 R; 283/58; 282/22 R
[58] Field of Search ................ 282/8 R, 9 R, 22 R, 282/27 R, 23 R; 281/215; 283/58, 70, 100, 101

[56] References Cited

U.S. PATENT DOCUMENTS

| | | | |
|---|---|---|---|
| 3,113,516 | 12/1963 | Johnson | 282/22 R X |
| 3,147,991 | 9/1964 | Heinz, Sr. | 283/58 X |
| 4,231,593 | 11/1980 | Bell, Jr. et al. | 283/58 X |
| 4,238,549 | 12/1980 | Dapp et al. | 428/484 |
| 4,375,382 | 3/1983 | Steidinger | 282/11.5 A |

Primary Examiner—Paul A. Bell
Attorney, Agent, or Firm—Dressler, Goldsmith, Shore, Sutker & Milnamow, Ltd.

[57] ABSTRACT

Tamper-resisting multipart negotiable instruments including at least two webs, their method of manufacture and use are described. The first web includes, on its second surface, a means for transferring an image to a surface in contact therewith when a corresponding image is inscribed on the first surface of that web. The first surface of the second web is in contact with the second surface of the first web and includes image receiving material at least in selected zones, such as destination and fare calculation zones, which is capable of receiving an image transferred from the second surface of the first web. The image receiving material comprises a particulate matrix erasably bonded to the second web, and which is defacable when rubbed with an organic solvent. The selected zones are provided with a machine readable pattern such as a multi-element bar code pattern. When an image is transferred to the second web, alteration of the transferred image will result in distortion of the machine readable pattern to produce a machine indication of alteration.

41 Claims, 6 Drawing Figures

TAMPER RESISTING MACHINE READABLE NEGOTIABLE INSTRUMENTS AND METHOD OF MAKING AND USING SAME

RELATED APPLICATIONS

This application is a continuation-in-part of U.S. application Ser. No. 612,854 filed May 22, 1984, now abandoned.

TECHNICAL FIELD

This invention relates to multipart negotiable instruments that are resistant to tampering, and particularly to multipart airline ticket books whose tickets, once filled out, resist subsequent tampering and which, if tampered with, are readily identifiable in simple machine-readable fashion.

BACKGROUND ART

Tampering with multipart negotiable instruments, such as checks, drafts, and tickets, such as airline tickets, by altering the amounts or destinations, or other information causes great monetary losses to the enterprises issuing them. Although various proposals have been made to alleviate this problem, they have not been entirely successful.

A new system which is the subject of U.S. patent application Ser. No. 389,216, filed June 17, 1982 and which is owned by the assignee of the present application has met with enthusiastic commercial acceptance. It has provided a system of alteration detection which is a substantial improvement over the other prior art systems. In that system multipart negotiable instruments are prepared that have improved resistance to tampering after images are applied thereto. In that system, an instrument is comprised of at least a first and a second generally planar web, each web defining a first and a second surface. The second surface of the first web includes a means for transferring an image to a surface in contact therewith when a corresponding image is inscribed upon the instrument. The second web is secured in stacked relation to the first web and its first surface is in contact with the second surface of the first web. The first surface of the second web includes a layer for receiving an image that is in register with at least a portion of the image transferring means of the first web, and which is capable of receiving an image from the image transferring means of the first web when a corresponding image is inscribed upon the instrument. The image receiving layer comprises a particulate matrix that is erasably bonded to the second web and is defaced when rubbed with organic solvent. The image receiving layer is also readily removable when a adhesive coated tape having a bond strength to steel of at least about 5 ounces per linear inch is bonded to the sheet and then pulled away.

Such multipart instruments are prepared by providing a first, generally planar web defining a first and a second surface. A material for transferring images is applied as a coating to the second surface of the first web to form an image transferring means. The transferring material is applied in an amount sufficient to transfer an image corresponding to one that is inscribed on the instrument, as upon the first surface of that web, to an image receiving layer on a second web in contact with the second surface of the first web. A second, generally planar web defining a first and a second surface is also provided. A coating or image receiving layer comprised of a particulate matrix erasably bonded to the web is applied to the first surface of the second web. The image receiving layer is defaced when rubbed with an organic solvent and is also removable when a adhesive coated tape having a bond strength, as of 5 ounces per linear inch, is affixed to it and then pulled away. The first and second webs are secured together in a stacked relation so that at least a portion of the image transferring means on the second surface of the first web is in contact and in register with at least a portion of the image receiving layer on the first surface of the second web.

Although this system is effective to provide a visual indication of tampering or alteration when one uses reasonable care to examine the tickets, unfortunately ticket takers too frequently, as in their rush to board passengers, fail to examine the tickets for forgery, thus allowing altered tickets to be used. Although it would be of advantage to provide a machine readable indication of alteration, the improved tickets of application Ser. No. 389,216 are not, in their present form, machine readable to identify alterations. Thus, the art does not yet supply a fully satisfactory means for readily identifying and therefore resisting tampering with the images on multipart negotiable instruments such as airline tickets.

SUMMARY OF THE INVENTION

According to the present invention, multipart negotiable instruments, such as multipart airline ticket forms, are provided that have improved resistance to tampering after images are applied thereto, and in which subsequent tampering is readily and easily detectable by machine reading. Thus, the negotiable instruments of the present invention may be scanned by a machine to determine whether they have been tampered with.

In one embodiment, the instrument is comprised of at least a first and a second generally planar web, each web defining a first and a second surface. The second surface of the first web includes a means for transferring an image to a surface in contact therewith when a corresponding image is inscribed upon the first surface of the first web.

The second web is secured in stacked relation to the first web and its first surface is in contact with the second surface of the first web. The first surface of the second web is provided with image receiving material and a machine readable pattern for receiving an image that are in register with at least a portion of the image transferring means of the first web, and which are capable of receiving an image from the image transferring means of the first web when a corresponding image is inscribed on the multipart form as on the first surface of the first web. The image receiving material may comprise a layer of a particulate matrix that is erasably bonded to the second web and that is defaced when rubbed with organic solvent. The image receiving material is also readily removable when a adhesive coated tape having a bond strength to steel of at least about 5 ounces per linear inch is bonded to the sheet.

The machine readable pattern may be a separate layer, such as a multi-element layer, superposed on the image receiving material, and may preferably be provided in at least one of the destination and fare calculation zones of a ticket when the multipart form is an airline ticket form. The machine readable pattern is such that if the transferred image is tampered with, the superposed pattern of the image receiving layer in the zone becomes distorted. When the distorted pattern is read, the machine readable characteristics of the pattern are so altered that the alteration is immediately apparent. Desirably, the layers are imprinted coatings, the pattern is applied with a screen density of from about 30% to no more than about 50% and the machine readable pattern is a bar code pattern which is readable with an infra-red reading means.

The multipart instruments of this invention can be prepared by providing a first, generally planar web defining a first and a second surface. A material for transferring images is applied as a coating to the second surface of the first web to form an image transferring means. The transferring material is applied in an amount sufficient to transfer an image corresponding to one that is inscribed upon the instrument as on the first surface of that web to an image receiving layer on a second web in contact with the second surface of the first web.

A second, generally planar web defining a first and a second surface is also provided. Image receiving material comprised of a particulate matrix erasably bonded to the web is applied to selected portions of the first surface of the second web. The image receiving material is defaced when rubbed with an organic solvent and is also removable when a adhesive coated tape having a bond strength as of 5 ounces per linear inch is affixed to it and then pulled away. The image receiving material in selected zones, such as in destination and fare calculation zones of an airline ticket, provides a coating of a machine readable pattern over and against which the image is to be inscribed. Preferably the pattern is applied over image receiving material.

The first and second webs are secured together in a stacked relation so that at least a portion of the image transferring means on the second surface of the first web is in contact and in register with at least a portion of the image receiving material and machine readable pattern. Most preferably, the pattern is in the destination zone.

The present invention and its use have a number of benefits and advantages including the fact that a machine readable pattern is altered when images transferred to the image receiving material and pattern are erased, due to the erasable bonding of the image receiving layer to its web, when alterations to a filled out multipart ticket are attempted by contact and rubbing with organic solvents, and when alterations to images are attempted with adhesive coated tapes.

Still further advantages and benefits of the present invention will be readily apparent to those skilled in the art from the description of the invention that follows and embodiments thereof, from the claims and from the accompanying drawings.

DETAILED DESCRIPTION

This invention can be practiced and used in many different forms. The specification and the accompanying drawings disclose a specific example of the invention and the invention is not intended to be limited to the specific example illustrated.

For ease of description, the embodiments of the invention will be described in a normal position of use, and terms such as upper, lower, contact, register and stacked relation, and the like will be used with reference to the normal position of use. It will be understood, however, that the multipart negotiable instruments or tickets of this invention can be manufactured, stored, transported, sold and used in other orientations.

Figure 1:
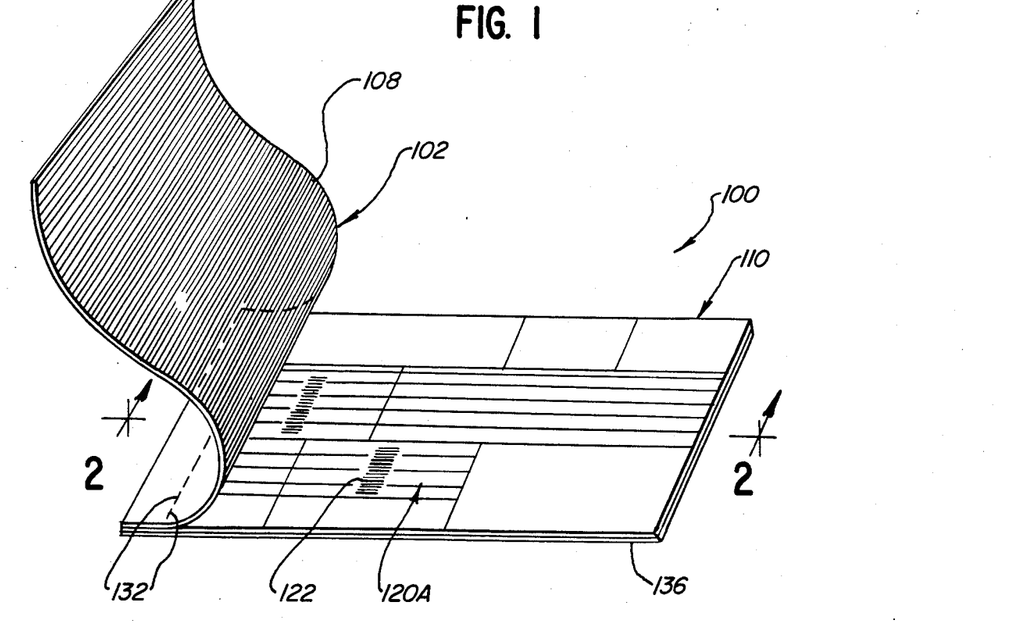
FIG. 1 is a perspective view of a presently preferred embodiment of a multipart ticket of this invention having one web partially folded backward.

FIG. 1 illustrates a multipart negotiable instrument such as a book 100 of airline tickets. Although the further description of the present invention will be made with regard to books of airline tickets, it is apparent that the principles and subject matter disclosed are equally applicable to other multipart negotiable instruments, such as checks, drafts, train and bus tickets, and the like, wherein multiple copies are desired to be prepared from an original without the use of mechanical copying equipment, and particularly where tampering with one or more of the multiple copies is an anticipated problem.

Figure 2:
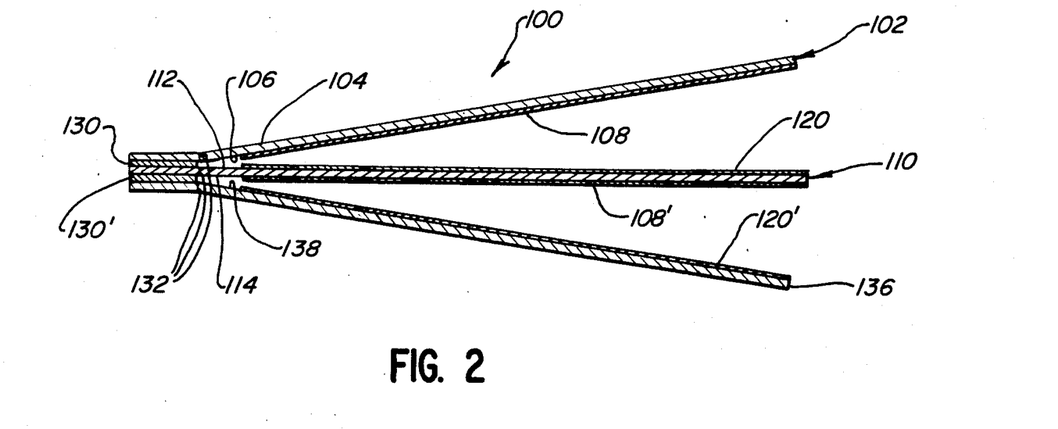
FIG. 2 is an enlarged sectional view of the embodiment of FIG. 1 shown, for ease of illustration, in a partially opened position, taken along line 2—2 of FIG. 1.

Referring to FIG. 2, the book of blank tickets prepared according to this invention contains at least two sheets or webs, namely an upper or first web 102 defining a first surface 104 and a second surface 106 bearing image transferring means 108 thereupon. The second web 110 of the book which is a ticket web defines a first surface 112 and a second surface 114. The first surface 112 of the second web 110 includes an image receiving layer 120 disposed thereon in at least selected zones of the first surface. In preferred practice, the image receiving layer 120 may be subdivided into several selected zones in which images may be received. The zones are preferably defined by lines or other indicia printed over or under the image receiving layer.

Figure 3:
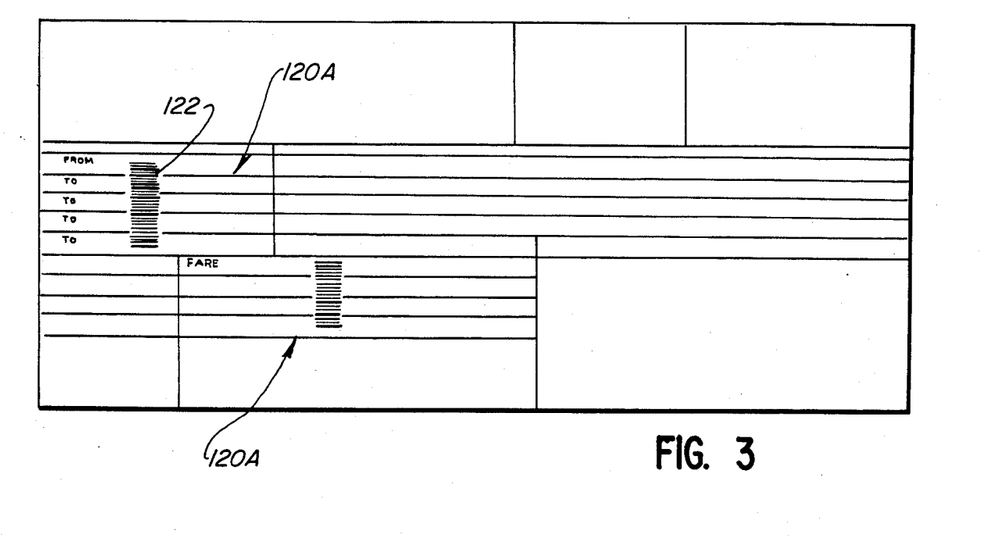
FIG. 3 is an enlarged view of a ticket web bearing an image receiving layer in selected zones and a machine readable pattern in selected zones.

As best seen in FIG. 3, at least one of the image-receiving layer zones 120A is overprinted with a superposed machine readable pattern. In this instance, the pattern is a multi-element bar code pattern 122 positioned in the destination zone of the ticket web. Desirably, the pattern is spaced between other printed indicia (to avoid interference in reading the pattern) and is most desirably somewhat to the left of the center of the destination zone. To insure that tampering will affect at least a part of the pattern 122, it is printed vertically, at least part of it intersecting the space for each horizontally disposed destination position within the destination zone.

Figure 4:
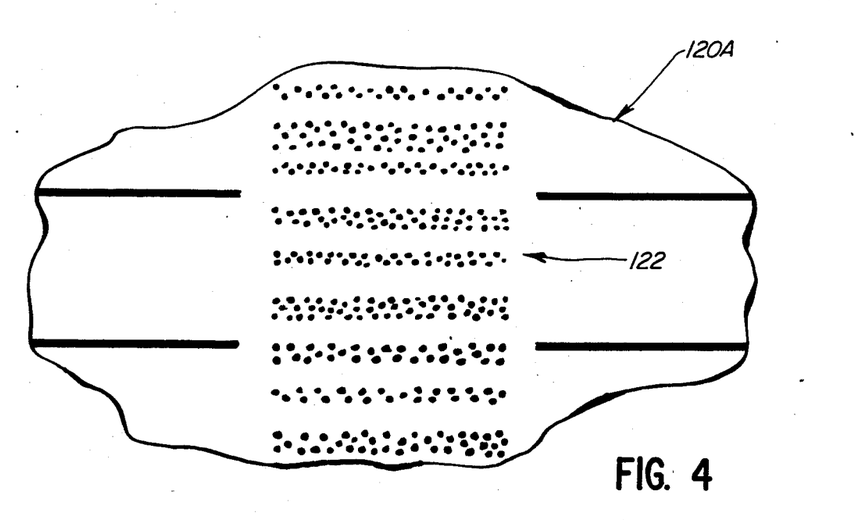
FIG. 4 is an enlargement of a portion of FIG. 3 showing, under magnification, a bar code screen pattern.

Especially in the embodiment in which a bar code pattern is used, the bar code is preferably printed or coated on the surface of the image receiving layer in a screen density of no more than about 50%, and most desirably in a screen density of about 30%. FIG. 4 illustrates that the ink covers only about 30% of the surface it coats. While patterns formed of such screen densities are machine readable, relatively less alteration produces a machine indication of tampering than does the same amount of alteration of a 100% screen density pattern. Thus, it is important that bar code pattern screen densities be less than about 50%, contrary to conventional bar code pattern printing which seems uniformly to indicate as close to 100% screen density (100% coverage) as possible.

The first web 102 and the second web 110 are secured to each other to form the book of ticket blanks by any convenient means such as by adhesive 130. In preferred practice, at least the web 110 is removable along a line of perforations 132. Some or all of the remaining webs within the book can be similarly removable.

A book 100 of ticket blanks may contain more than two webs, as is illustrated by FIG. 2. In this instance, the second ticket web 110 is a central web, and includes the image receiving layer 120 on its first surface 112 and also includes an image transferring means 108' disposed upon its second surface 114. Here, an additional, third ticket web 136 having an image receiving layer 120' disposed upon its first surface 138 and zones for receiving images defined by indicia printed over the image receiving layer 120' and with an aligned bar code pattern 122 is placed under the second web in stacked, contacting and registered relation thereto, in the same manner in which the second web was placed under the first web. The third web 136 or additional webs (not shown) are also preferably secured in the ticket book as by adhesive means 130', and are made detachable therefrom, as by perforations 132'.

A typical suitable machine readable bar code pattern is one which may be read by a hand-held probe. Typically, such a probe may be used by rapidly traversing the bar code pattern. If the pattern has not been altered, i.e., the predetermined pattern of lines, their width, and the relative spacing between them remains unaltered, an audible signal, such as a beep, is produced when the probe is traversed across the bar code pattern to indicate that the pattern is intact. However, if one of the lines has been substantially reduced in intensity, removed, or the spacing disturbed, the traverse fails to produce a signal for two, three, four or more passes. This "mechanically" indicates a possible alteration to the ticket and alerts the recipient of the ticket, such as a ticket agent, that it may have been altered. The ticket agent can then visually examine the ticket to see whether it has indeed been altered.

It is also possible to place a ticket of the present invention in a bar code reading unit which either moves the ticket past a reader or which traverses the bar code pattern with an internally moved signal generator. The result produced will be the same.

A wide variety of bar code readers and probes are available for these purposes. They are generally sensitive to a particular material or wave-length range, such as carbon and carbon-based inks when the probe is infra-red sensitive.

Typical suitable hand-held scanning devices or wands are those which include an infra-red light emitting diode (LED) and a suitable photo transister which produce a high signal-to-noise ratio when reading carbon based inks. The wand is provided with a cord which plugs into a suitable interface, such as a solid state, programable bar code reader assembly. The wand power requirements are +5VDC±0.25VDC with the LED on and produces an output signal in the range of about 100 millivolts. A suitable wand is adapted to read bars and spaces exceeding 0.0075 inch. A suitable signal is produced in the range of 820–940 nanometers. Typical wands are those available from Intermec Corporation of Lynnwood, Wash. (Model 1236) and Control Module Inc. of Enfield, Ct. (Model CMI 2901), as well as others.

The webs of the books 100 can be made from various papers and synthetic fibers as are known in the art for the preparation of tickets and other multipart negotiable instruments. In preferred practice, the webs are paper and the surfaces of the paper are hardened and smoothened as desired with conventional sizings and/or by calendering. The hardening assists in retarding of penetration of the various layers that are subsequently applied to the surfaces of the webs.

The smoothness of the preferred paper webs can differ from one surface of the web to the other, and can be specified in units of microinches by a surface smoothness indicator in accordance with the standard paper industry smoothness measurements. Thus, in preferred practice, both surfaces may have a smoothness of about 35 microinches to about 100 microinches. In more preferred practice, the paper web surface that includes the image transferring means may have a surface smoothness of about 50 microinches to about 85 microinches, while the surface of the paper bearing the image receiving layer may have a surface smothness of about 60 to about 95 microinches. Surface smoothness can be measured by a Gould SURFANALYZER 7100 model 21-01200-00 manufactured by Gould, Inc. of Rolling Meadows, Ill.

The image transferring means can be comprised of any one of a number of well-known transferring agents. The important feature of the image transferring means is that it transfer an image to an image receiving layer 120, 120' and the bar code patterns 122, 122' when those layers are in contact with each other and a corresponding image is inscribed as by writing with a ballpoint pen, pencil, or by typewriter, as upon the first surface of the web that includes the image transferring means or on a surface or web that overlies the web bearing the image transferring means.

The word "inscribed" in its various grammatical forms is used herein to mean a sufficient amount of pressure is applied directly or indirectly to the first surface 11 of the web 12 bearing the image transferring means 16 so that an image or indicia corresponding to the image or indicia inscribed can be transferred to the image receiving layer. The normal pressures used in writing with ball point pen, pencil or typewriter are sufficient for that inscribing.

Included among the suitable materials comprising the means for transferring images to the image receiving layer of the web 110, are commonly used carbon-containing coatings, and microencapsulated inks. Thus, substantially any material that can be transferred by inscription from one surface and be retained upon the image receiving layer is suitable.

In preferred practice, the image transferring means is comprised of a colorant-medium dispersion; i.e., a colorant, such as a dye or pigment, dispersed in a hydrophobic medium. Suitable colorants include barium lithol, carbon black and methylviolet oleate. Suitable hydrophobic media include carnauba wax, beeswax and paraffin waxes, and the like, or mixtures thereof. The waxes can be used alone as well as in combination with naturally occurring and synthetic oils, such as mineral oil, which serve to plasticize or soften the waxes. In addition, fillers such as kaolin, petrolite, and the like may also be present in the colorant-medium dispersion.

The hardness of the image transferring means in relation to the hardness of the image receiving layer also plays a role in that the surface of the image transferring layer should be softer than the surface of the image receiving layer as used on its web.

Generally, the hardness of the final image transferring means can be pretested by making a penetrometer determination upon a block or other flat-surfaced shape of the material comprising the image transferring means. In preferred practice, the image transferring material exhibits a penetrometer reading (in units of 0.1 millimeter), of more than about 5 and less than about 30 units. In more preferred practice the penetrometer reading is about 10 to about 20 units. In most preferred practice, penetrometer readings are about 14 to about 18 units. A Universal Penetrometer with 50 gram applied load for a total load of 100 grams, and a dwell time of about 5 seconds is used for these measurements.

Another way to compare the relative hardnesses of the image transferring material and the image receiving layer is by the effect of attempts to write upon each surface, as coated and dried upon their respective webs, using pencil "leads" of different degrees of hardness.

Using pencil leads having a diameter of 0.5 millimeters and a usual writing pressure, a preferred image transferring means is scratched, and removed, but not written upon by a lead having a hardness of at least about B; i.e., by leads having a hardness of B, HB, H and harder. A 2B pencil lead also scratches the surface of a preferred image transferring means, but transfers some of the lead to the transferring means. Thus, the surface of a preferred image transferring layer is scratched and removed by writing thereon with a pencil lead having a hardness of at least 2B.

Similarly, the coated and dried surface of the image receiving layer is written upon by pencil leads having a hardness of at least up to 6H. The surface of the image receiving layer is therefore harder than a 6H pencil lead.

The image transferring material is applied as a coating to at least a portion of the desired web surface by coating methods known in the art, such as from a solvent dispersion or a melt, to form the image transferring means. The coating is suitably applied to the web surface in an amount to provide an image transferring layer at about 0.8 to about 4 pounds per ream of 20 inch by 30 inch paper, after drying. In preferred practice, the image transferring material is applied to the paper in an amount of about 1 to about 2.5 pounds per ream, and more preferably at about 1.1 to about 2.0 pounds per ream.

The image receiving layers 120 and 120' of webs 110 and 136 comprise a particulate matrix. The particulate matrix can itself be comprised of a number of solid materials that are insoluble or substantially insoluble in water and organic solvents. Exemplary particulate matrix materials include usual inorganic pigments and fillers such as titanium dioxide, zinc oxide, silica, calcium carbonate, calcium sulfate and the like, and mixtures thereof, as well as a suitable colorant. The choice of fillers can be made to vary the opacity of the ultimately formed image receiving layer from being opaque to translucent, as is known in the art.

The particles are ground to a fine consistency so that they can be preferably printed flexographically upon the surface of the desired web. A useful average particle size is about 15 to about 60 microns in the largest dimension. Preferably, the average particle size is about 5 to about 6 using the North Standard measurements of particle size which correspond to particles having an average largest dimension of about 25 to about 40 microns.

The particulate matrix is erasably bonded to the desired web in preferred practice by an organic polymer that can be soluble or dispensible in organic solvent or in water, or mixtures thereof. Exemplary organic polymers include polyvinyl butyral resin, acrylic ester homopolymers and copolymers, such as those of acrylic acid and methacrylic acid esters of $C_1$-$C_8$ alcohols polymerized with themselves, as well as with other monomers such as styrene, acrylic acid, methacrylic acid, maleic acid, acrylamide, methacrylamide and N-substituted $C_1$-$C_8$ derivatives thereof. As is known in the latex paint art, polymers that contain acidic groups can be made water soluble or dispersible by neutralization of the acid groups with a base such as sodium hydroxide, amines such as ammonia or ethanolamine and the like. In addition, water solubility and dispersibility can also be improved by copolymerization of monomers that contain hydroxyl groups such as 2-hydroxyethyl acrylate or N-(2-hydroxyethyl) methacrylamide.

Polyvinyl butyral resins are particularly preferred.

The image receiving layer can be applied to the web by lithographic, gravure, flexography, web offset or other suitable printing processes.

In preferred practice, the weight ratio of the organic solvent-soluble polymer to that of the particulate matrix in the flexagraphic-type ink is about 1:3 to about 1:5.

It is preferred that the polymer be dissolved or dispersed in an organic solvent and the phrase "organic solvent" will be used illustratively hereinafter with the understanding that water, admixtures of water and an organic solvent are also useful. The word "soluble" will be used for convenience hereafter to include materials that are either soluble or dispersible.

As noted above, the image receiving material is preferably flexographically printed onto the desired web. To that end, the particulate matrix and bonding polymer are dispersed and/or dissolved in a suitable solvent to form a flexographic-type ink.

The phrase "organic solvent" is used herein to include usual liquid solvents of low molecular weight (less than about 250 Daltons). Typically useful organic solvents include hydrocarbon solvents such as hexane and benzene, ketones such as acetone and methyl ethyl ketone, esters, such as ethyl acetate and butyl acetate, chlorocarbons such as trichloroethylene, trichloroethane and chloroform, as well as alcohols such as methanol, ethanol, and the like. In addition, mixed organic solvents, such as lacquer thinner and mineral spirits, as well as mixtures of the above solvents fall within the definition "organic solvent" as used herein. A particularly preferred organic solvent is ethanol.

The organic solvent is preferably used in a volume, which if anhydrous ethanol, would comprise about 40 to about 60 weight percent of the total flexographic-type ink used for making the image receiving layer coating. More preferably, the volume of organic solvent comprises about 45 to about 55 weight percent of the flexographic-type ink, as anhydrous ethanol.

The amounts of the above ingredients comprising the flexographic-type ink used to prepare the image receiving layer are easily adjusted to provide a coating, after drying at 150° F., of about 1.25 to about 1.55 pounds per ream of paper, the paper again being 20 inches by 30 inches. In more preferred practice, the amount of image receiving layer after drying is about 1.3 to about 1.45 pounds per ream calculated upon the area of the web covered with the layer. That desired amount is typically obtainable from a composition that has a viscosity using Zahn No. 2 conditions at 70° F. (21° C.) of about 50 to about 65 seconds.

It is noted that the image receiving layer need not cover the entire surface of the web to which it is applied. In preferred practice, the image receiving layer covers at least selected zones or portions of zones of the first surface of the web, e.g. for tickets, the portions or zones containing points of destination as well as that fare calculation zone wherein the cost of the trip is inscribed. It is in at least one of those portions or zones that a machine readable pattern 122 is provided.

After drying, the image receiving layer so produced may be defaced and also stained by light, fingertip rubbing with organic solvents. The layer also demonstrates defacement when liquid water is lightly rubbed upon its surface, although the layer is preferably somewhat less sensitive to water than to organic solvents to permit ease of usage under conditions of high relative humidity. The layer is removed when rubbed with a pencil eraser.

The image receiving layer is also removable from the web surface when an adhesive tape having a bond strength to steel of about 5 ounces per linear inch (about 5.5 Newtons per 100 millimeters) is applied and then pulled away therefrom under the conditions of Federal Test Method Standard 147c. (Substantial removal of the image receiving layer can be effected by an adhesive tape having a bond strength to steel of about 6 ounces per foot (about 7 Newtons per 100 millimeters) and subsequent pulling of the tape away from the surface of the image receiving layer, using the above test conditions.

In addition, the image receiving layer is more readily removable from the web than are images transferred to or through the image receiving layer by inscription.

When less than the selected amounts of the image receiving material is applied to the web surface, easy visual perception of erasure in the image receiving zone tends to be lost. When greater than the selected amount of the image receiving material is applied to the desired surface, the image receiving layer tends to crack or flake off prematurely, and some of the flexibility of the image receiving layer is lost.

The image receiving layer is also capable of receiving images written or inscribed directly thereon, as by ballpoint, fountain or "felt-tip" pens, pencils, crayons and the like.

As noted previously, the first surface of the web including the image receiving layer may define zones wherein the images are received. Those zones 120A are defined by indicia applied at least in part over or under the image receiving layer by conventional printing techniques such as offset and lithographic printing, using standard printing inks. When indicia are printed over the image receiving layer, those indicia are also removed by erasure and when a tape is applied to the surface of the layer and then pulled off slowly.

At least one of the zones 120A is coated or overprinted with a bar code pattern 122. As such, the erasability, defacement with solvents, and tape pull-away features of the image receiving layer are also imparted to the bar code machine readable patterns.

The bar code pattern 122 is produced by imprinting the image-receiving layer with a standard commercial web offset ink containing hydrocarbon solvents and carbon black pigments. Such a pattern is readily readable by a hand-held probe with a sensitivity of 820-940 nanometers. The pattern is desirably deposited with a screen density of 30%.

A book of ticket blanks, can be prepared that contains a plurality of webs similar to the second web 110 illustrated in the drawings. In addition, the ticket books 100 of this invention can utilize image transferring means and image receiving layers different from those described herein, as long as there is at least one web containing an image transferring means, as described before, which transferring means is in contact and stacked relation with a surface of a second web and which includes the image receiving material and machine readable pattern.

The portion of the web that underlies the image receiving material or layer may be of a color that contrasts with the color of the image receiving material and which also, preferably, contrasts with the color of the image transferring means. In the most preferred practice, the image receiving layer and the web upon which it is coated may also exhibit contrast when irradiated with ultraviolet light. The bar code pattern preferably may be visible to the naked eye to assist in human scanning for tampering, or may be non-human visible.

To prepare a ticket blank book of the instant invention, a first, generally planar web defining a first and a second surface is provided. The coating of image transfer means is thereafter applied to at least a selected portion of the second surface of that first web in an amount sufficient to transfer an image that is inscribed upon or against the first surface of that first web onto an image receiving layer on a second web in contact with the second surface of the first web.

A second generally planar web defining a first surface and a second surface is also provided. A suitable coating of image receiving material is applied to at least a portion of the first surface of that second web, as by flexographic printing. That image receiving layer comprises the above described particulate matrix erasably bonded to that web surface. The image-receiving layer is then provided with a superposed machine readable pattern in one or more selected zones as by printing. Alternatively, the image receiving layer may be a multi-element pattern of image receiving material which is machine readable and which is adapted to receive suitable indicia to be transferred from the image transferring layer.

The first and second webs are adhesively secured together in stacked relation so that at least a portion of the image transferring means on the second surface of the first web is in contact and in register with at least a portion of the image receiving material and machine readable pattern on the first surface of the second web to thereby form the book of ticket blanks. The webs are preferably made removable from the book of ticket blanks by providing score lines in the webs at desired locations.

When ticket books of this invention comprise more than the minimum two webs described above, and at least some of those additional webs include both an image transferring means and an image receiving layer, it is preferred that the image receiving material be first coated on the web, and dried to the touch. When the bar code pattern is separate from the image receiving material and is imprinted as a separate layer over the surface of the image receiving layer, thereby covering at least selected portions of the image receiving layer, the application of the bar code pattern follows, and in turn is followed by coating the image transferring material on the other surface thereof. Any underprinting of the image-receiving layer may be accomplished prior to coating of the image receiving material.

The ticket blank books are used to provide improved resistance to tampering after the ticket or web of the form is issued. An image is inscribed upon one web, transferring the inscribed image from at least one transferring means to at least one image receiving layer and superposed machine readable pattern on a second web in contact and in register therewith. The ticket containing the now difficultly alterable image or indicia so transferred is thereafter issued.

BEST MODE FOR CARRYING OUT THE INVENTION

Example 1

Book of Airline Ticket Blanks

A book of airline ticket blanks of this invention was prepared from a white roll of calendered paper having a smoothness of about 80 microinches on one surface and a smoothness of about 60 microinches on the other surface. The image receiving layer was applied on a selected area on the 80 microinch surface by flexographically printing a dispersion of North Standard size 5-6 particles and polyvinyl butyral resin in organic solvent. The weight ratio of particles to copolymer to solvent was about 21:5:24, with the solvent comprising a mixture of ethanol and ethyl acetate in a weight ratio of about 13:1, respectively. The dispersion had a Zahn No. 2 viscosity of 57 seconds at 21° C. (about 70° F.). Total solids content of the dispersion was about 54 percent by weight and included small amounts of plasticizing oils. The image receiving layer was applied at an average generally uniform coverage of 1.3–1.45 pounds per ream, after drying at 150° F.

The surface bearing the image receiving layer was then overprinted with lines to define zones for receiving images and with other airline ticket indicia. The image receiving layer was further overprinted with a machine readable bar code pattern with a commercial web offset ink containing hydrocarbon solvents and carbon black pigments having a screen density of about 30% applied as described above, i.e., by web offset printing. The printing on the image receiving layer was suitably dried.

A dispersion of barium lithol as colorant, carnauba wax and plasticizing oils as hydropholic medium was further dispersed in trichloroethylene, and thereafter applied on the surface of the above coated paper having a smoothness value of 60 microinches to provide the image transfer means. Penetrometer readings on blocks of the colorant-medium dispersion prior to further dispersion in trichloro- ethylene averaged 14 to 18. After drying, it was determined that the material of the image transferring means had been applied at an average generally uniform coverage in excess of 1 pound per ream.

After the material comprising the image transfering means had dried, the paper was perforated, and was cut into webs of the desired size, leaving about one-half inch between the perforations and the edge of the web.

Two types of additional webs cut to the same size as the above web were also prepared. The first additional web included perforations, printed lines and airline ticket indicia on one surface and the image transferring means, prepared as described before, on the other surface. The second additional web included perforations, and an image receiving layer, overprinted lines and airline ticket indicia on the same surface, and a machine readable bar code pattern having a screen density of about 30% applied as described before.

The individual webs were assembled in a stack with the image transferring means of each web in contact with the image receiving layer of the web below it and the printed lines of each web in register. The stack so made contained a web having an image transferring means but no image receiving layer as the top-most web, and a web having an image receiving layer but no image transferring means as the bottom-most web. Webs between the top-most web and the bottom-most webs included both an image transferring means and an image receiving layer superposed by a machine readable bar code pattern. Adhesive was placed on the web portion between the perforations and the edge, and the individual webs were glued together to form the book of airline ticket blanks.

Example 2

Tamper-Resistance Determinations

Sample ticket blanks prepared substantially as described in Example 1 were examined for resistance to tampering. The sample webs were suitably conditioned prior to making the examinations. The results were as follows:

| | Observations |
|---|---|
| Application Of The Indicated Material In The Zone Of A Bar Code Pattern Followed By Light Rubbing With The Index Finger | |
| Acetone | The green printing smeared and defaced when wet. The bar code pattern was found to have become so distorted that a non-signal was produced with a probe having a sensitivity of nominally 900 nanometers. |
| Turpentine | The green printing rubbed off. The bar code pattern was found to have become so distorted that a non-signal was produced with a probe having a sensitivity of nominally 900 nanometers. |
| Erasure By A Common Pencil Lead Eraser | Severe rub-off of green printing to the underlying white sized paper was observed. The bar code pattern was found to have become so distorted that a non-signal was produced with a probe having a sensitivity of nominally 900 nanometers. |
| Application Of Scotch Brand Adhesive Tape Over The Green Layer | When the layer was pulled off slowly, it removed the green layer and revealed the underlying white sized paper. The bar code pattern was found to have become so distorted that a non-signal was produced with a probe having a sensitivity of |

| -continued |
|---|
| Observations |
| nominally 900 nanometers. |

The foregoing results show (1) the solvents and chemicals commonly used to alter airline tickets severely defaced the ticket surface by permanent staining or smearing of the image receiving layer; (2) the stains and defaced areas were very visible frequently as white areas by the naked eye, (3) those physical properties provide readily discernible evidence to indicate that there was an attempt to alter the subject matter in the image receiving layer of the ticket, and (4) the machine readable bar-code pattern produced no signal, i.e., an indication of tampering.

Webs having image receiving layers with superposed machine readable bar code patterns that would be useful for receiving transferred images in negotiable instruments were quantitatively compared for their resistance to successful tampering by means of erasure in the manner described in U.S. application Ser. No. 389,216.

The tests showed that a negotiable instrument of this invention would show improved resistance to tampering when compared to a similar instrument made only from commercially available, fugitive security inks and that erasure would sufficiently alter the bar code pattern that a probe sensor of the type described above produces an indication of alteration.

It is apparent that other machine readable patterns may be used with the image-receiving layer and which may be similarly distorted or altered when efforts are made to alter the image transferred. Preferably the pattern is a multi-element pattern of which the multiple bar elements of a bar code are typical. Other characters such as a plurality of numbers or even helical patterns or the like having a plurality of discrete portions may be used as a multi-element machine readable pattern. For example, an optical character-readable pattern may be substituted for the bar code pattern. Such readers or scanners may be optically sensitive or may be electrically sensitive to patterns or intensities. An optical character readable pattern may be read by a stationary reader with which the ticket is juxtaposed. If the pattern has been altered, then an electrical signal will be generated (or not generated), and a visual inspection of the ticket can be undertaken. Similarly, magnetically readable patterns may be used for "inspection" by a magnetic pattern sensitive device. In such a case the printed pattern would employ an ingredient which is magnetically sensed. The important thing always is that the provision of the machine readable pattern and the image-receiving material will make it possible to ascertain automatically whether a ticket is suspect, so that it may then be visually verified. It is also apparent that particular formulations, such as those which are specially infrared recognizable, may also be examined by other readers which may be sensitive to other ink characteristics or other wave lengths.

With many forms of readers a "quiet" or lead-in zone is preferred for producing consistent, accurate readings. For example, where the scanner is to sense a high visible pattern (a pattern which contrasts distinctly against a background which is different), it is desireable to provide a lead-in zone of about one-fourth inch. Thus, if the background is white or beige, there should be a zone of about one-fourth inch comprising a lead-in before the pattern is exposed to and transversed by the sensor.

Where the pattern to be read is the image-receiving material, that then requires a one-fourth inch zone which is free of that material. In some instances this would provide sufficient space to alter an image and to permit forgery.

Figure 5:
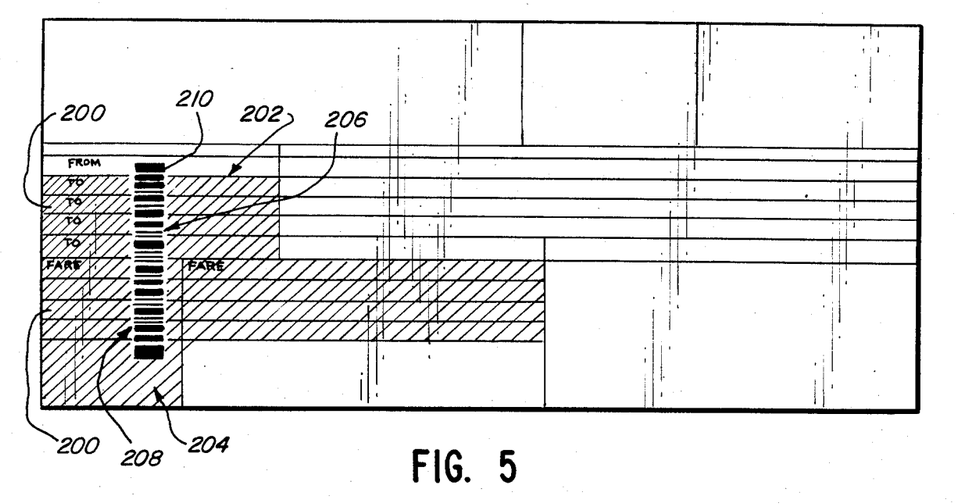
FIG. 5 is a view like FIG. 3 of a further modification of the present invention.

To avoid that possibility, in accordance with present invention, the usual reading characteristics of a scanner-reader may be reversed so that the pattern to be read will be the light colored zones and the background will be the darker image-receiving material, as is illustrated by FIG. 5. As there shown, the image-receiving material 200 is deposited in the destination zone 202 and one of the fare zones 204. In the zones of the machine readable patterns, the image-receiving material is deposited in segmental patterns 206, 208 such as in negative bar code type patterns, leaving between the segments of the patterns 206, 208 machine readable portions of high contrast, such as the white color of the ticket web in the fare calculation zone and the light beige color imprinted on the upper portion of the ticket web in the destination zone. Those portions define bar code patterns which are light against either a dark surrounding background, the medium blue image-receiving material, or against a sufficiently long lead-in bar 210 of image receiving material to provide the necessary "quiet" lead-in.

For high contrast usage, the image receiving material need not be carbon containing i.e., need not be infra-red sensitive. Further, the contrast should be as great as possible to minimize machine sensitivity to eliminate false negatives as much as possible.

Figure 6:
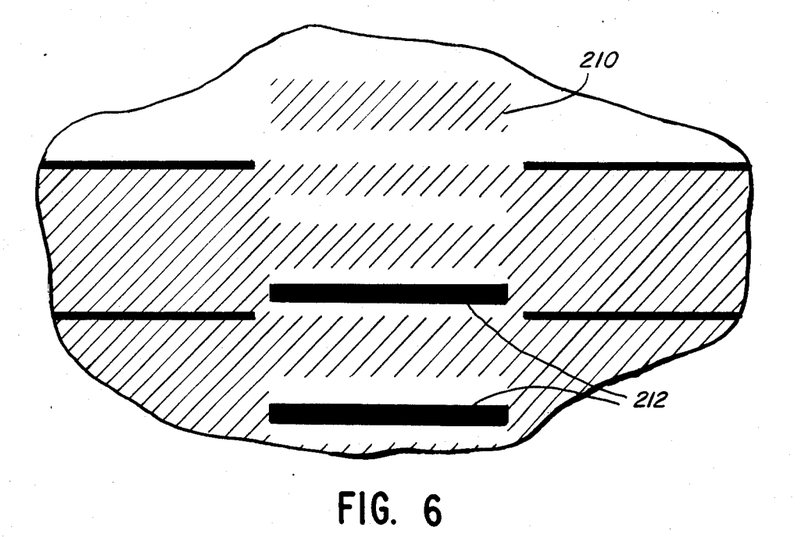
FIG. 6 is a view, like FIG. 4, of a portion of FIG. 5.

To maintain the integrity of the segmental patterns 206, 208 it is desirable that they be imprinted in a screen density of at least 60%. Those portions of the segmental pattern that are very narrow (such as portions 212, FIG. 6) should preferably be imprinted with a screen density of 100%. Although the segmental patterns may be spaced at their ends from the surrounding image receiving material by a distance of about 1/32 inch, it is preferred that there be essentially no light colored lead-in portions, and that the segmental pattern merge with the background image-receiving material. However, depending upon the orientation and location of a particular segmental pattern, it is possible that it may extend beyond the main body of the associated image-receiving material, hence, will have a contrasting or light colored section of the ticket partially surrounding it. That is illustrated by pattern 206.

Because it is the image-receiving material which is defaceable to provide evidence of alteration of a ticket or other form, it is apparent that the segmental pattern can be produced not only by imprinting the image-receiving material in a pattern, but also by overprinting a solid zone of dark image-receiving material with a contrasting ink which produces the equivalent of the light colored bar code pattern. Thus, attempted alteration will remove either the image-receiving material adjacent the light colored ink, or will remove the light colored ink and the underprinted image-receiving material. Each will produce altered light zones which will provide a signal indicative of an attempted alteration of the ticket. Each will produce visual evidence of alteration as well.

A typical suitable machine readable bar code pattern is one which may be read by a hand-held probe. Typically, such a probe may be used by rapidly traversing the bar code pattern. If the pattern has not been altered, i.e., the predetermined pattern of lines, their widths, and the relative spacing between them remains unaltered, an audible signal, such as a beep, is produced when the probe is traversed across the bar code pattern, thereby to indicate that the pattern is intact. However, if one of the lines has been substantially changed by alteration of the intervening image-receiving material, as by having the spacing disturbed, the traverse will fail to produce a signal for two, three, four or more passes. This "mechanically" indicates a possible alteration to the ticket and alerts the recipient of the ticket, such as a ticket agent, that it may have been altered. The ticket agent can then visually examine the ticket to see whether it has indeed been altered.

It is also possible to place a ticket of the present invention in a bar code reading unit which either moves the ticket past a reader or which tranverses the bar code pattern with an internally moved signal generator. The result produced will be the same.

A wide variety of bar code readers and probes are available for these purposes. They may be of a type which use a probe which is infra-red sensitive, where the image-receiving material is carbon containing as described above, or may be of a type of probe which is sensitive to high visual contrast. Such a sensor senses visual contrast where the portion of the web that underlies the image-receiving material or layer is of a color that contrasts with the color of the image-receiving material. In the most preferred practice, the image-receiving layer and the web upon which it is coated may also exhibit contrast when irradiated with ultraviolet light. The bar code pattern preferably may be visible to the naked eye to assist in human scanning for tampering, or may be non-human visible where only machine readability is desired.

A typical high contrast probe which may be used is a high resolution digital bar code hand held scanner wand having an 820 nm infra-red LED made by Hewlett Packard under the designation HEDS-3200. Such sensors read bars or spaces with nominal widths of 0.19 mm.

The preferred form of image-receiving material is the particulate matrix which is described above. However, in some environments it may be possible to use a so-called "fugitive" ink which is adapted to receive the image transferring material, and which is also removeable when one attempts to alter the ticket. Such fugitive inks tend to be eraseable and defaceable when rubbed with many organic solvents. They are less easily removed with adhesive tape and therefore tend not to demonstrate alteration attempts as readily with tape. Adhesive tape removal, however, is relatively infrequently used and is not as successfully employed as are the other alteration methods. Thus, where a user is willing to forego protection against a relatively minor possibility, matrices such as fugitive inks may be used as the image-receiving material.

If it is not important to provide an eye visual indication of alteration, then other reading schemes may be used as well. For example, similar colorants can be used, for a background and for the segmental pattern defining the machine readable elements. The different colorants may have difficult machine readable characteristics, such as different reflectances which, when one is altered, will signal that alteration. Other such machine readable distinctions which may be used will be apparent to those skilled in the art. Hence, other machine readable types of ingredients and reader combinations will be apparent to those skilled in the art from the teachings of the present application.

Thus, in accordance with this invention, especially in situations where ticket takers, such as airline personnel are required to accept a large number of tickets in a short time and cannot be relied upon to make the necessary visual check (or may be unable to recognize a sophisticated alteration), they can rapidly machine read the tickets and can with certainty then be warned of suspect tickets. The potential cost savings to the airlines is enormous.

From the foregoing, it will be observed that numerous variations and modifications can be effected without departing from the true spirit and scope of the novel concept of the invention. It is to be understood that no limitation with respect to the specific embodiments illustrated herein is intended or should be inferred. It is, of course, intended to cover by the appended claims all such modifications as fall within the scope of the claims.

What is claimed is:

1. A method of preparing and using a multipart negotiable instrument of improved resistance to tampering by employing a machine readable pattern comprising the steps of:
   (a) providing a first, generally planar web defining a first surface and a second surface with a layer of a material for transferring an image on at least a portion of the second surface of the first web to form an image transferring means;
   (b) providing a second, generally planar web defining a first surface and a second surface and having image receiving material on at least selected portions of the first surface of the second web capable of receiving an image transferred from said image transferring means when said means is in contact with said material and a corresponding image is inscribed against the multipart instrument, said image receiving material comprising a material erasably bonded to the first surface of the second web and defacable when rubbed with organic solvents;
   (c) providing a superposed machine readable pattern on at least one of said selected portions of said second web,
   (d) securing said first web and said second web together in stacked relation so that at least a portion of the image transferring means on said second surface of said first web is in contact and in register with at least a portion of said machine readable pattern;
   (e) transferring an image comprising a portion of said image transferring means from said image-transferring means to the surface of said image receiving material and confronting said machine readable pattern; and
   (f) thereafter machine reading said pattern to ascertain whether said pattern has be altered.

2. The method in accordance with claim 1 comprising the step of providing said pattern between a segmental pattern of image receiving material.

3. The method in accordance with claim 1 comprising the steps of providing said image receiving material and pattern on said second web by imprinting them on said second web.

4. The method in accordance with claim 3 in which said machine readable pattern is imprinted with a screen density of from about 30% to about 50%.

5. The method in accordance with claim 3 comprising providing said machine readable pattern in the form of a multi-element pattern.

6. The method in accordance with claim 3 comprising providing said multi-element pattern in the form of a bar code pattern.

7. The method in accordance with claim 6 comprising providing said pattern in the form of an infra-red detectable pattern, and wherein said step of said machine reading comprises machine reading with an infra-red sensitive reading means.

8. A method of preparing and using a multipart negotiable instrument of improved resistance to tampering and having a machine readable pattern comprising the steps of:
(a) providing a first, generally planar web defining a first surface and a second surface with a layer of a material for transferring an image on at least a portion of the second surface of the first web to form an image transferring means;
(b) providing a second, generally planar web defining first and second surfaces, and bearing an image receiving material and associated machine pattern on at least selected portions of the first surface of the second web and capable of receiving an image transferred from said image transferring means when said image transferring means is in contact with said material and pattern and a corresponding image is inscribed against the multipart instrument, said image receiving material comprising a particulate matrix erasably bonded to the first surface of the second web and defacable when rubbed with organic solvents;
(c) securing said first web and said second web together in stacked relation so that at least a portion of the image transferring means on said second surface of said first web is in contact and in register with at least a portion of said image receiving material and machine readable pattern;
(d) transferring an image comprising a portion of said image transferring means from said image-transferring means against the surface of said image receiving material and machine readable pattern; and
(e) thereafter machine reading said pattern to ascertain whether said pattern has been altered.

9. The method in accordance with claim 8 comprising providing said machine readable pattern in the form of image receiving material.

10. The method in accordance with claim 8 comprising providing machine readable pattern material on said second web which is different from said image receiving material.

11. The method in accordance with claim 10 comprising providing said pattern in the form of a multi-element pattern superposed on a layer of said image receiving material, whereby transfer of an image from said image transferring means transfers some of said image to said layer and to some of the elements of said superposed multi-element pattern.

12. The method in accordance with claim 10, comprising the steps of imprinting said machine readable pattern material and image receiving materials on said first surface of said second web.

13. A method of preparing and using a multipart airline ticket form and verifying a ticket portion of said form to assure that the ticket portion has not been tampered with comprising the steps of:
(a) providing a multipart ticket form having
(1) a first, generally planar web defining a first surface and a second surface with a layer of a material for transferring an image on at least a portion of the second surface of the first web to form an image transferring means;
(2) a second, generally planar web which is a ticket, said ticket defining a first surface, having at least destination and fare calculation zones, and a second surface, and having image receiving material on one or more of the destination and fare calculation zones and being capable of receiving an image transferred from said image transferring means when said image transferring means is in contact with said material and a corresponding image is inscribed against the multipart form, said image receiving layer comprising a particulate matrix erasable bonded to the first surface of the second web and defacable when rubbed with orgainic solvents, said layer being removable when an adhesive coated adhesive tape is applied to said image receiving layer and then pulled away therefrom;
(3) a machine readable pattern in at least one of said zones;
(4) and said first web and said ticket being secured together in stacked relation so that at least a portion of the image transferring means on said second surface of said first web is in contact and register with at least a portion of said machine readable pattern on the ticket;
(b) transferring visible indicia comprising a portion of said image transferring means from said image-transferring means over and onto said machine readable pattern on said ticket, and then issuing the multipart ticket form; and
(c) verifying said ticket by machine reading said pattern to ascertain whether said pattern has been altered.

14. The method in accordance with claim 13 in which said image receiving material is deposited as a layer in one or more of said zones, and said pattern is imprinted on said layer.

15. The method in accordance with claim 13 and wherein said pattern is a multi-element pattern, and wherein in issuing said multipart ticket form, said visible indicia is transferred to overlie multiple elements of said multi-element pattern.

16. The method in accordance with claim 13 and wherein said multi-element pattern is a bar code pattern and in issuing said multipart ticket form said image-transferring means is transferred against said machine readable pattern.

17. A machine readable multipart negotiable instrument having improved resistance to tampering after inscription of an image thereon, said instrument comprising at least a first generally planar web and a second generally planar web,
said first web defining a first surface and a second surface, said second surface including means for transferring an image to a surface in contact with the image transferring means when a corresponding image is inscribed upon the first surface of said first web;
said second web being secured to said first web in stacked relation therewith, and defining a first surface and a second surface, said first surface being in contact with the second surface of said first web, the first surface of said second web bearing a layer of image receiving material in at least selected portions of said first surface, said image receiving layer also being in register with the image transferring means on said first web and capable of receiving an image from said image transferring means in said selected portions when a corresponding image is inscribed against said instrument;

said image receiving material comprising a particulate matrix erasably bonded to the second web and defacable when rubbed with an organic solvent, said material being removable when an adhesive tape is applied to said image receiving layer and then pulled away therefrom;

and a machine readable pattern in at least one of said selected portions whereby when an image is inscribed against said instrument over a machine readable pattern in a selected zone, a corresponding image is transferred from said image transferring means onto said machine readable pattern.

18. The machine readable multipart instrument in accordance with claim 12 in which said pattern is imprinted on said second web.

19. The machine readable multipart instrument in accordance with claim 12 in which said machine readable pattern is of a screen density of no more than about 50%.

20. A machine readable multipart instrument in accordance with claim 14 in which said screen density is about 30%.

21. The machine readable multipart instrument in accordance with claim 12 in which said pattern is a multi-element pattern.

22. The machine readable mulitpart instrument in accordance with claim 21 in which said pattern is imprinted on said layer of image receiving material.

23. The machine readable multipart instrument in accordance with claim 21 and in which said multi-element pattern is defined by image receiving material.

24. A machine readable multipart instrument in accordance with claim 12 and wherein said instrument comprises a book of ticket blanks and said tickets define destination zones and said pattern is disposed in said destination zones.

25. A machine readable multipart instrument in accordance with claim 12 in which said pattern is a bar code pattern.

26. A machine readable multipart instrument in accordance with claim 25 in which said bar code pattern comprises image receiving material.

27. A machine readable multipart instrument in accordance with claim 25 in which said bar code pattern comprises the pattern between a segmental pattern of image receiving material.

28. A multipart airline ticket book form having improved resistance to tampering after inscription of indicia thereon, said instrument comprising at least a first generally planar web and a second generally planar ticket web defining a plurality of portions, including at least destination and fare calculation portions;

said first web defining a first surface and a second surface, said second surface including means for transferring an image to a ticket web surface in contact with the image transferring means when a corresponding image is inscribed upon the airline ticket form, said ticket web being secured to said first web in stacked relation therewith, said ticket web defining a first surface and a second surface, said first surface being in contact with the second surface of said first web, the first surface of said ticket web bearing image receiving material in one or more of selected portions of the ticket web, said portions comprising at least one of said destination and fare calculation portions, said image receiving material being in register with at least a portion of said image transferring means on said first web and being capable of receiving indicia from said image transferring means when corresponding indicia are inscribed upon said airline ticket form;

said image receiving material being erasably bonded to the ticket web and defacable when rubbed with an organic solvent;

and a machine readable pattern in at least one of said selected portions, whereby when indicia are inscribed upon said form over a machine readable pattern in a selected zone, a corresponding image is transferred from said image transferring means onto said machine readable pattern so that if attempts are made thereafter to alter the indicia by erasing or by rubbing with an organic solvent, the machine readable pattern will be altered.

29. The ticket book form in accordance with claim 28, and wherein said image receiving material comprises a layer and said pattern is superposed thereon.

30. The ticket book form in accordance with claim 28, and wherein said pattern is a multi-element pattern.

31. The ticket book form in accordance with claim 30 in which said pattern is a bar code pattern.

32. The ticket book form in accordance with claim 30, and in which said pattern is defined by image receiving material.

33. The ticket book form in accordance with claim 30, and in which said pattern is defined by elements between a segmental pattern of image receiving material.

34. The ticket book form in accordance with claim 33, and in which said elements are bar code elements.

35. The ticket book form in accordance with claim 28 in which said pattern is of a screen density of no more than about 50%.

36. The ticket book form in accordance with claim 28 and further including a third generally planar ticket web having a first surface confronting the second surface of said second web, said second web having an image transferring means on its second surface, and said first surface of said third web being constituted as is the first surface of said second web with image receiving material and a machine readable pattern thereon, and wherein when said image is inscribed against said instrument, said corresponding image is superposed on said image receiving material and on said pattern on the first surfaces of each of said second and third webs.

37. The ticket book form in accordance with claim 28, and wherein said image receiving material is deposited in a segmental pattern to define said machine readable pattern.

38. The ticket book form in accordance with claim 37, and wherein said pattern is a multi-element pattern.

39. The ticket book form in accordance with claim 38, and wherein said pattern is a bar code pattern, the bars comprising the spaces between the positions of said segmental pattern.

40. The ticket book form in accordance with claim 39, and wherein said segmental pattern is deposited in a screen density of at least 60%.

41. The ticket book form in accordance with claim 40, and wherein said image receiving material comprises a particulate matrix bonded to the ticket web and defaceable when rubbed with an organic solvent, said material also being removeable when an adhesive tape is applied to said image receiving material and then is pulled away therefrom.

* * * * *